United States Patent

[11] 3,624,696

| [72] | Inventors | Irving Cohen<br>Flushing;<br>Harold J. Byrne, Garden City, both of N.Y. |
|---|---|---|
| [21] | Appl. No. | 821,318 |
| [22] | Filed | May 2, 1969 |
| [45] | Patented | Nov. 30, 1971 |
| [73] | Assignee | Aqua-Air Systems, Corp.<br>New York, N.Y. |

[54] GAS SCRUBBING APPARATUS
4 Claims, 3 Drawing Figs.

[52] U.S. Cl. .................................................. 55/223,
                        55/248, 55/249, 261/118, 261/119
[51] Int. Cl. ............................................. B01d 19/00
[50] Field of Search............................................ 55/223,
                        248, 249; 261/118, 119

[56] References Cited
UNITED STATES PATENTS

| 2,379,795 | 7/1945 | Fenn | 55/249 |
| 2,491,645 | 12/1949 | Clark et al. | 55/249 |
| 2,833,528 | 5/1958 | Schroeder | 261/118 X |
| 3,335,551 | 8/1967 | Golay | 55/249 X |
| 3,516,647 | 6/1970 | Jaffe et al. | 55/249 X |

Primary Examiner—Tim R. Miles
Assistant Examiner—Steven H. Markowitz
Attorney—Marvin Reich ABSTRACT: Air contaminated with particles enters an enclosure at relatively high velocity through an inlet passage having a water spray blanket projected thereacross. Within the enclosure, the air impacts against a water pool maintained at a constant level and has its direction of flow changed abruptly thereabove several times by a system of overlapping baffles. Extreme turbulence is induced in this zone and means are provided to induce some recirculation toward the water pool. Substantially cleaned air expands through a moisture eliminator into a drying chamber and discharges through the outlet of a blower which also serves to move the air through the entire apparatus.

INVENTORS
IRVING COHEN
HAROLD J. BYRNE

BY

ATTORNEY

GAS SCRUBBING APPARATUS

BACKGROUND OF THE INVENTION

Various forms of air and gas cleaners or scrubbers are known in the prior art including scrubbers for removing particulate solids from a contaminated airstream. Most of these prior art devices, while in general accomplishing their objectives, are unduly complex and bulky and tend to be inefficient and also costly. Consequently, the aim of this invention is to improve upon the prior art by the provision of an air or gas scrubber which is simplified, compact and economical to construct and, above all, is more efficient in its operation than similar prior art units.

In general, a stream of gas containing suspended particles and flowing at a relatively high velocity is caused to impinge on scrubbing fluids and a series of impaction and abrupt direction changing baffles. Extreme turbulence and swirling is induced, together with recirculation through a first zone above a cleaning liquid pool. The scrubbed gas then expands and passes at a lower velocity through a drying zone after being relieved of its moisture substantially through a moisture eliminator device at the inlet of the drying zone. Substantially all solid particles are driven into the scrubbing liquid during the operating cycle and may be drained off periodically into a sewer.

Additional features and advantages of the invention will be apparent during the course of the following description.

BRIEF DESCRIPTION OF DRAWING FIGURES

DETAILED DESCRIPTION OF PREFERRED EMBODIMENT

Figure 1:
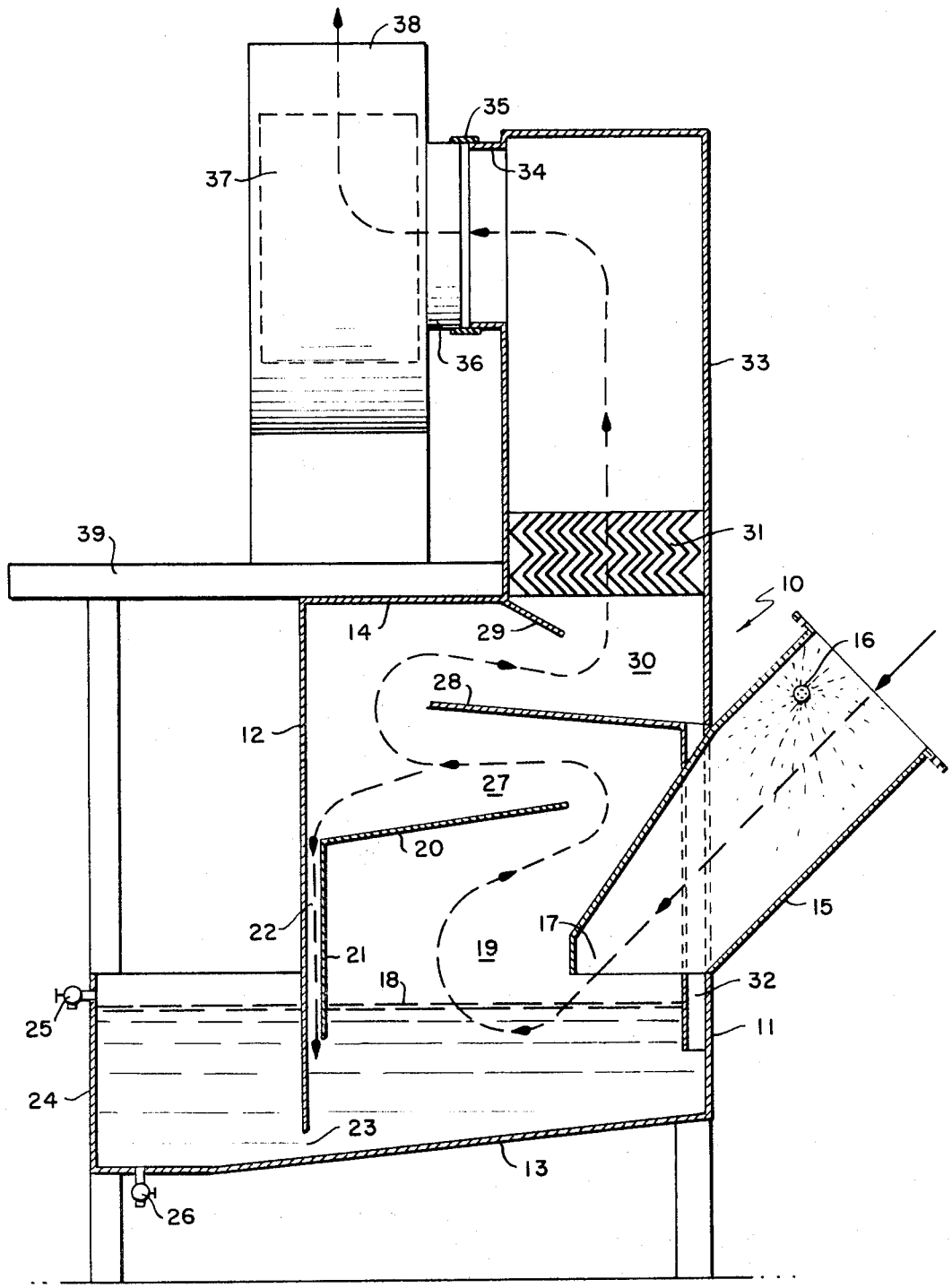
FIG. 1 is a central vertical section through a gas scrubber embodying the invention and being partly diagrammatic.

Referring to the drawings in detail, wherein like numerals designate like parts, the numeral 10 designates generally a rectangular tank or housing having forward and rear walls 11 and 12 and a preferably sloping base 13 and a horizontal top wall 14. A gas inlet sleeve 15 is connected in the front wall 11 centrally thereof and receives continuously a relatively high-velocity stream of solid particle contaminated air or gas from a supply conduit, not shown, coupled to the inlet sleeve. Near the mouth of the sleeve 15, relatively high-pressure water spray heads 16, FIG. 2, direct opposing sprays entirely across the interior of the sleeve 15 in a blanket pattern and the incoming airstream impinges upon this water spray blanket and is suddenly cooled and has its velocity decreased somewhat and some solid particles are removed from the air or gas. At the lower outlet end of the sleeve 15, the velocity of the airstream again increases due to the venturi effect of the somewhat constricted outlet portion 17.

A pool of gas scrubbing water is maintained in the bottom of the tank 10 at a constant level 18 near and below the outlet 17 of sleeve 15. The contaminated airstream entering through the sleeve 15 is directed downwardly and impacts strongly against the scrubbing water pool, giving up more solid particles and the airstream is compelled to change direction abruptly, turning upwardly into a first turbulence zone 19 beneath the first of a series of generally horizontal but somewhat inclined overlapping baffles, indicated at 20. A vertical baffle plate 21 depending from the first inclined baffle 20 is spaced slightly forwardly of the tank rear wall 12 and forming therewith a relatively narrow vertical air recirculation passage 22. The water surface 18 and the vertical baffle 21 form two right angular impaction surfaces which receive the airstream and cause it to change direction abruptly. Particulate matter too heavy to make this major directional change, having been mixed with the liquid in the tank, begins to sink into the scrubbing liquid and drift toward an opening 23 of the wall 12 leading into a drain and overflow tank extension 24 having an overflow pipe 25 and a bottom sump drain 26 leading to a sewer so that solid material can be withdrawn periodically. The proper water level 18 or makeup is provided by the spray heads 16 at all times.

In the chamber 19, powerful water turbulence induced by the pressure of the blower, to be described, constantly attacks the gas as it turns abruptly into a second chamber or zone 27 below a second inclined baffle 28 which partially overlaps the baffle 20. A heavy spray is created in the chamber 27 which carries through this chamber and returns substantially through the previously mentioned passage 22 in a downward direction toward the scrubbing liquid bath or pool on the base of the tank. This induced recirculation results in collecting further solid particles as they seek to escape from the air stream.

Upon leaving the chamber 27, the gas is again forced to change directions abruptly as indicated by the arrows in FIG. 1 and by this time, most of the water and particulate matter has returned to the scrubbing liquid bath through the passage 22. The gas impacts against a third and shorter baffle 29 adjacent the top wall 14 of the tank and begins to expand into a third chamber 30 directly below a conventional zigzag blade water eliminator 31, the blades of which provide at least four more impaction surfaces, as shown. As the stream passes through the eliminator 31 and is dispersed thereby by the action of the blades, water particles remaining in the stream drop out and return to the base of the tank through a tube 32 arranged at the base of the baffle 28 and along the front wall 11.

Figure 2:
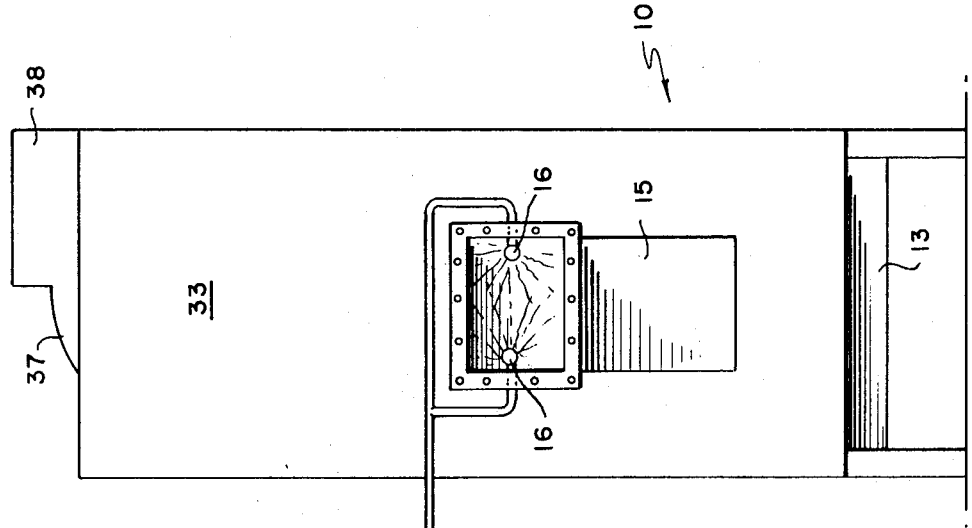
FIG. 2 is a front side elevational view of the apparatus.
Figure 3:
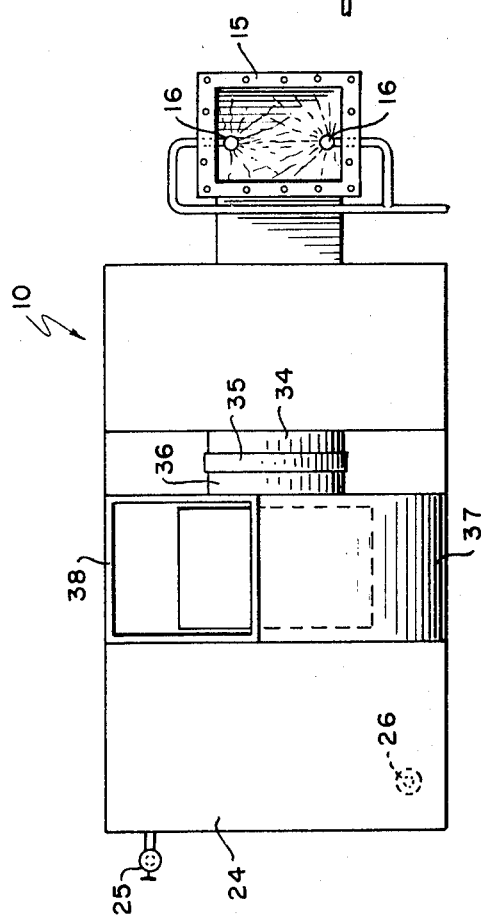
FIG. 3 is a top plan view of the apparatus.

Upon exiting upwardly through the eliminator 31, the scrubbed gas expands and travels at relatively low velocity through a drying chamber 33 atop the tank 10 formed as a relatively narrow extension thereof, FIG. 1, but extending for the full width of the tank in FIG. 2. At its top, the drying chamber 33 has a horizontal outlet 34 coupled as at 35 to an inlet 36 of a suitable blower 37 having an outlet 38 for the purified dry gas or air which is returned to the desired use point by suitable conduit means, not shown. The blower may be firmly supported on frame bars 39 extending from the tank 10, as indicated in FIG. 1.

As described, the gas scrubber has at least nine specific points of impaction for the gas stream plus multidirectional abrupt flow changing means to assure thorough scrubbing. Induced recirculation through the passage 22 further increases efficiency and the moisture eliminator 31 permits air flow into the dryer while retarding moisture effectively. The simple tank 10 forms the support for internal components, as shown, and external components 15, 24, 33 and 37 are also supported by the tank so as to form a very compact unit which is economical to construct.

It is believed that the features and advantages of the invention over the prior art will now be fully apparent without the necessity for further description.

We claim:

1. A gas scrubber comprising a scrubbing tank adapted to contain a scrubbing liquid in its base at a predetermined level, a downwardly directed inlet having a constriction at its lower end forming a venturi to increase the velocity of a gas directed therethrough toward said scrubbing liquid in the base of the tank, all of said gas impacting said scrubbing liquid surface, said constriction at the lower end being perpendicular to and above the surface of said scrubbing liquid in its quiescent state, scrubbing liquid spray means in the mouth of said gas inlet forming a spray blanket substantially across said mouth, the liquid spray emitting from the spray means flowing through the gas inlet into the base of the tank to maintain a substantially constant scrubbing liquid level therein, said tank having an overflow drain means thereon, said downward directed inlet being for a stream of particle contaminated gas opening through one side of the tank and having a bottom gas outlet in closely spaced opposing relation to the scrubbing liquid in the base of the tank, plural superposed vertically spaced gas stream impaction baffles within the tank above said scrubbing liquid level and above said gas inlet causing abrupt directional changes of the gas stream within the tank, a gas expansion chamber immediately beyond the uppermost baffle of said plurality, a moisture eliminator unit immediately above said expansion chamber, a gas drying chamber extension on the tank above said eliminator unit, said moisture eliminator being horizontal across the entire drying chamber at the lower part of said drying chamber, said moisture eliminator having vertical zigzag blades for eliminating said water, blower means connected with the upper portion of the drying chamber extension for removing dried purified gas therefrom, the uppermost baffle of said plurality disposed substantially at the tank top wall and immediately below the eliminator and being in convergent relationship with the next lowermost baffle to form a restricted flow passage opening into said expansion chamber immediately below the eliminator, said drying chamber having a horizontal outlet on the rear side thereof, said blower having a horizontal inlet coupled to the outlet of the drying chamber, said blower supported substantially by the top wall of the tank near the outlet side of the drying chamber extension, said extension being vertically elongated, the base of said tank sloping downwardly from its forward side toward its rear side, a sump drain and overflow tank extension on the rear of said tank and passage means placing said tank and tank extension in communication adjacent said sloping base whereby solids may gravitate into the tank extension.

2. The structure of claim 1, and a vertical baffle depending from the lowermost of said plural baffles near and forwardly of the tank rear wall and forming therewith a vertical recirculation passage leading downwardly to the scrubbing liquid in the base of said tank.

3. The structure of claim 2, and a vertical return passage for liquid below said moisture eliminator and near the tank front wall to return moisture removed from the gas body eliminator to the base of the tank.

4. The structure of claim 1, and said uppermost baffle being a short baffle in comparison to the other baffles and projecting only partially beneath the eliminator.

* * * * *